United States Patent
Emma

(10) Patent No.: US 9,483,322 B1
(45) Date of Patent: Nov. 1, 2016

(54) HETEROGENOUS CORE MICROARCHITECTURE

(71) Applicant: International Business Machines Corporation, Armonk, NY (US)

(72) Inventor: Philip G. Emma, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/135,779

(22) Filed: Apr. 22, 2016

Related U.S. Application Data

(63) Continuation of application No. 14/870,442, filed on Sep. 30, 2015.

(51) Int. Cl.
  *G06F 9/50* (2006.01)
  *G06F 9/46* (2006.01)
  *G06F 9/48* (2006.01)

(52) U.S. Cl.
  CPC .......... *G06F 9/5094* (2013.01); *G06F 9/4881* (2013.01); *Y02B 60/142* (2013.01); *Y02B 60/144* (2013.01)

(58) Field of Classification Search
  CPC .......................... G06F 9/5094; Y02B 60/142
  See application file for complete search history.

(56) References Cited

U.S. PATENT DOCUMENTS

| | | | | |
|---|---|---|---|---|
| 5,392,437 A | * | 2/1995 | Matter | G06F 9/3885 712/E9.069 |
| 2006/0095807 A1 | * | 5/2006 | Grochowski | G06F 1/206 713/324 |
| 2009/0293061 A1 | * | 11/2009 | Schwinn | G06F 9/3851 718/103 |
| 2011/0072213 A1 | * | 3/2011 | Nickolls | G06F 12/0862 711/122 |
| 2013/0326135 A1 | * | 12/2013 | Carter | G06F 3/0655 711/111 |
| 2014/0181501 A1 | | 6/2014 | Hicok et al. | |
| 2016/0092274 A1 | | 3/2016 | Singh et al. | |

OTHER PUBLICATIONS

James E. Smith & Ravi Nair, "The Architecture of Virtual Machines," (IEEE Computer, vol. 38, Issue 5, May 2005, pp. 32-38.*
Ken Cline, "Update: Reaction to: 'How to Correctly Explain the Architectural Differences Between Hyper-V and ESX'", Apr. 2009, URL: http://kensvirtualreality.wordpress.com/2009/04/23/reaction-to-how-to-correctly-explain-the-architectural-differences-between-hyper-v-and-esx/, 7 pages.*

(Continued)

*Primary Examiner* — Andrew Caldwell
*Assistant Examiner* — Yuqing Xiao
(74) *Attorney, Agent, or Firm* — Cantor Colburn LLP

(57) ABSTRACT

Embodiments relate to a heterogeneous core microarchitecture. An aspect includes binding, by an operating system that is executing on a processor comprising a core comprising a heterogeneous microarchitecture comprising two or more flows, a job that is being executed by the operating system to a flow of the two or more flows. Another aspect includes issuing an instruction corresponding to the job with a tag indicating the binding of the job to which the instruction corresponds. Yet another aspect includes executing the instruction by the flow in the core that is indicated by the tag.

1 Claim, 5 Drawing Sheets

(56) References Cited

OTHER PUBLICATIONS

El-Moursy et al., "Partitioning Multi-Threaded Processors with a Large Number of Threads," Mar. 2005, IEEE International Symposium on Performance Analysis of Systems and Software, ISPASS 2005, pp. 112-123.*

Shen et al., "Modern Processor Design—Fundamentals of Superscalar Processor," Beta Ed., Oct. 2009, McGraw-Hill Companies, Inc., pp. 308, 13, 28.*

* cited by examiner

HETEROGENOUS CORE MICROARCHITECTURE

DOMESTIC PRIORITY

This application is a continuation of U.S. patent application Ser. No. 14/870,442, filed Sep. 30, 2015, and all the benefits accruing therefrom under 35 U.S.C §119, the contents of which is herein incorporated by reference in its entirety.

BACKGROUND

The present invention relates generally to computer processor architecture, and more specifically, to a heterogeneous core microarchitecture for a computer processor.

As multi-core processors become more commonplace, power management issues become more important. In a design era in which "green computing" is of ever-increasing importance, system- or datacenter-level power management and control, requires effective, programmable power management accessibility across computing elements within each microprocessor chip. In addition to providing large, efficient power reduction capability via dynamic voltage and frequency control, there is a need to provide smaller degrees of power reduction (when needed) at minimal complexity and performance overhead. The current generation of multi-core microprocessor chips does not provide such fine-grain, global, multi-core power management accessibility.

Power management solutions may incorporate particular power-saving mechanisms for a given core or non-core component within a microprocessor chip. However, local conditions, such as temperature or region-specific workload variations, trigger individual power-saving mechanisms and are not amenable to effective global control and optimization via an on- or off-chip system power manager.

SUMMARY

Embodiments include a method for a heterogeneous core microarchitecture. An aspect includes binding, by an operating system that is executing on a processor comprising a core comprising a heterogeneous microarchitecture comprising two or more flows, a job that is being executed by the operating system to a flow of the two or more flows. Another aspect includes issuing an instruction corresponding to the job with a tag indicating the binding of the job to which the instruction corresponds. Yet another aspect includes executing the instruction by the flow in the core that is indicated by the tag.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
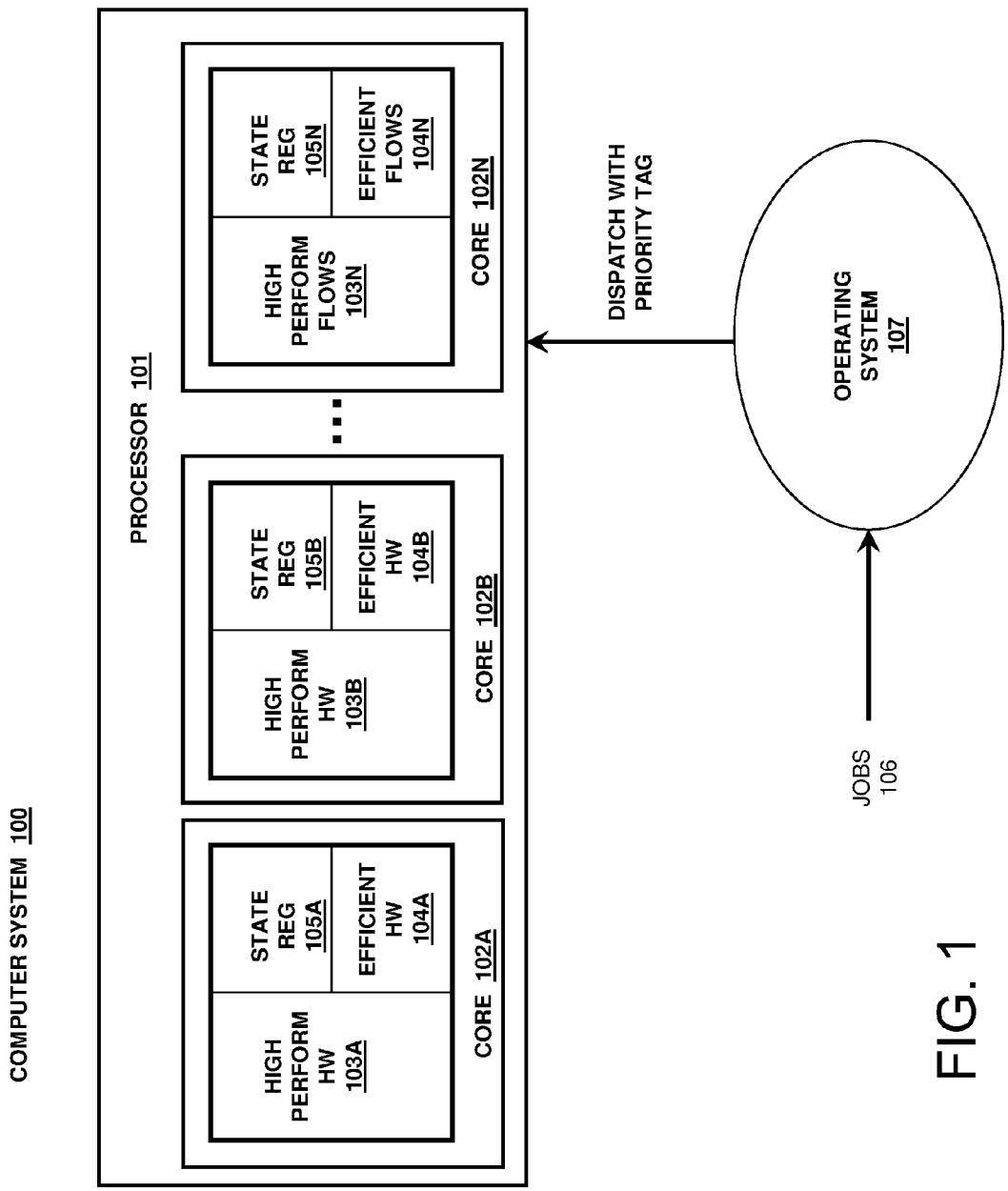
FIG. 1 depicts a computer processor comprising a heterogeneous core microarchitecture in accordance with an embodiment.

Embodiments of a heterogeneous core microarchitecture are provided, with exemplary embodiments being discussed below in detail. In a processor core comprising a homogeneous core microarchitecture, all programs execute on the same core hardware, such that all programs running on one core use the same amount of power. In a processor comprising a heterogeneous core microarchitecture, multiple types of flows, which may comprise separate hardware, may be provided within each individual core of a processor. A single core may include, for example, both high performance and energy efficient flows, or hardware, allowing programs to be bound to an appropriate type of hardware for execution, depending on the requirements of the programs. A processor may include one or more identical cores, wherein each of the cores includes the heterogeneous microarchitecture comprising two or more flows. The heterogeneous microarchitecture prescribes physical flows of programs through that core, such that the operating system can bind any program to a specific flow. The two or more flows may be on the same hardware being run in different modes, or on distinct hardware in various embodiments. In embodiments comprising distinct hardware, the core may include separate caches for each flow that are kept coherent.

As used herein, a core comprises a unit that executes a program within a processor, and processor defines a system containing multiple cores. A heterogeneous processor may include more than one kind of core. In a heterogeneous processor, programs that run on different types of cores will have different performances, and will use different amounts of energy. However, in order to run on a heterogeneous processor, the operating system needs to know which physical cores are of what type, so that programs may be bound to appropriate physical cores within the processor. Therefore, an operating system running on a heterogeneous processor cannot be assigned to a virtual machine because the operating system requires knowledge of the underlying physical machine. In a heterogeneous microarchitecture, each individual core in a processor has more than one possible flow. For processors comprising only heterogeneous cores, the composite processor is homogeneous, while the possible flows are heterogeneous. In a computer system comprising a homogeneous processor, wherein each core in the homogenous processor comprises a heterogeneous microarchitecture, an operating system may run on a virtual machine, and assign different hardware types to different programs.

In some embodiments, different flows may be run on the same hardware with different restrictions applied, i.e. a first set of restrictions may cause the core hardware to operate in an energy efficient mode, and a second set of restrictions may cause the core hardware to operate in a high performance mode. In other embodiments, the different flows may be run on physically different hardware, and the core may include first hardware that is specifically designed for performance, and second hardware that is specifically designed for energy efficiency.

FIG. 1 illustrates an embodiment of a computer system 100 including a processor 101. The processor 101 is made up of a plurality of cores 102A-N. Each of cores 102A-B includes high performance hardware 103A-N, energy efficient hardware 104A-N, and state registers 105A-N. Jobs 106 are executed by operating system 107 on the computer system 100. Each job of jobs 106 may be bound by the operating system 107 as appropriate for high performance or energy efficient hardware. Requests, or instructions, from the jobs 106 are dispatched to the processor 101, each having a priority tag that is set by the operating system 107. The priority tags are used within each core 102A-N to determine whether a particular instruction will be executed by high performance hardware, such as high performance hardware 103A-N, or by efficient hardware, such as energy efficient hardware 104A-N. FIG. 1 is shown for illustrative purposes only; for example, a processor may include any appropriate number of heterogeneous microarchitecture cores in various embodiments. Further, in some embodiments, the flows of a heterogeneous microarchitecture may comprise the same hardware that is run in different modes.

Figure 2:
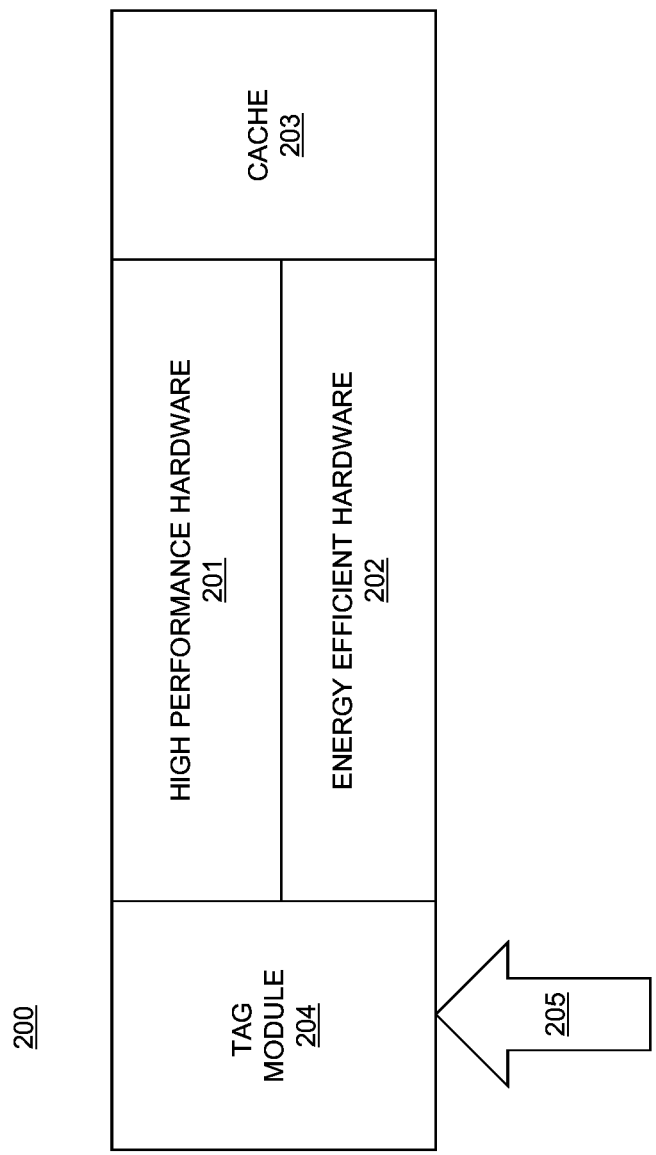
FIG. 2 depicts a core comprising a heterogeneous microarchitecture in accordance with an embodiment.

FIG. 2 illustrates an embodiment of a core 200 comprising a heterogeneous core architecture. Core 200 may comprise any of cores 102A-N of FIG. 1. Core 200 includes high performance hardware 201 and energy efficient hardware 202, in addition to a cache 203 and a tag module 204. Cache 203 may include multiple levels of cache, and may, in some embodiments, include different caches that are assigned to one of the high performance hardware 201 and energy efficient hardware 202. In such embodiments, the different caches in cache 203 are kept coherent. In some embodiments, high performance hardware 201 and energy efficient hardware 202 may comprise the same hardware run with different restrictions, or modes. In other embodiments, high performance hardware 201 and energy efficient hardware 202 may comprise separate hardware. Tag module 204 determines the tag associated with instructions that are received on instruction input 205 and dispatches the instruction to the appropriate hardware (i.e., high performance hardware 201 or energy efficient hardware 202).

Figure 3:
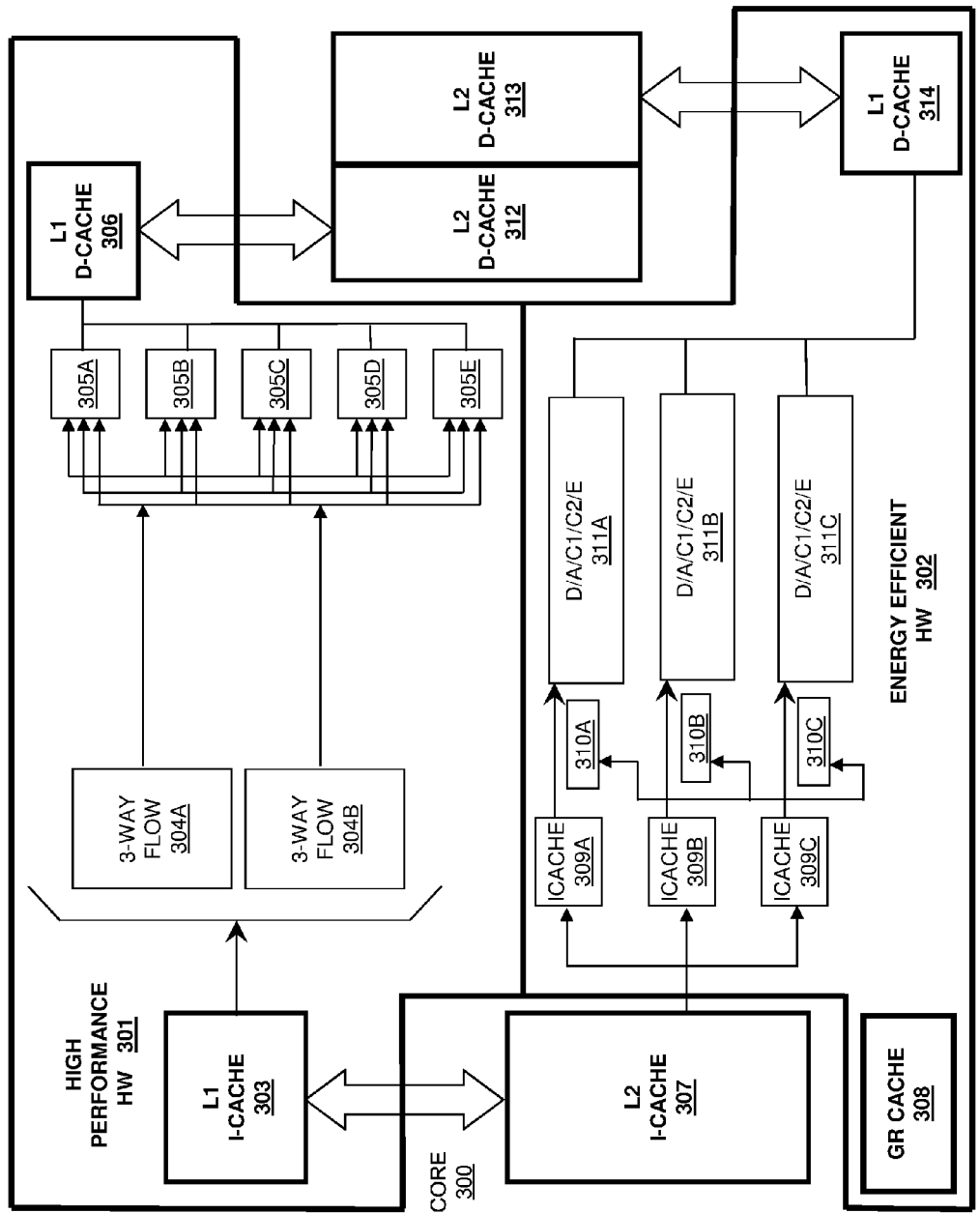
FIG. 3 depicts a core comprising a heterogeneous microarchitecture in accordance with an embodiment.

FIG. 3 illustrates another embodiment of a core 300 comprising a heterogeneous core architecture. Core 300 may comprise any of cores 102A-N of FIG. 1. Core 300 includes high performance hardware 301, and energy efficient hardware 302. High performance hardware 301 includes a dedicated L1 instruction cache 303 in communication with two 3-way flow instruction dispatching units 304A-B. The 3-way flow instruction dispatching units 304A-B dispatch 6 instructions at a time instructions to parallel execution elements 305A-E, which may include but are not limited to a fixed point unit, a floating point unit, a load/store unit, and a branch prediction unit. The execution elements 305A-E perform the instructions using data from L1 data cache 306. L2 instruction cache is shared by the high performance hardware 301 and the energy efficient hardware 302. Energy efficient hardware 302 includes 3 relatively small (e.g., 64 kilobytes) local instruction caches 309A-C which load instructions from the L2 instruction cache 307. The instructions are executed using general purpose registers 310A-C and instruction pipelines 311A-C. Each instruction pipeline 311A-C may include a plurality of stages including decode, address generation, and two cycles of execution. Data for the execution of instructions is held in L1 data cache 314. General register cache 308 holds data for thread switching in the energy efficient hardware 302. L1 data cache 306 is in communication with L2 data cache 312, and L1 data cache 314 is in communication with L2 data cache 313. L1 data cache 306, L2 data cache 312, L2 data cache 313, and L1 data cache 314 are kept coherent during operation of core 300. FIG. 3 is shown for illustrative purposes only; a core comprising a heterogeneous microarchitecture may comprise any appropriate hardware in various embodiments.

Figure 4:
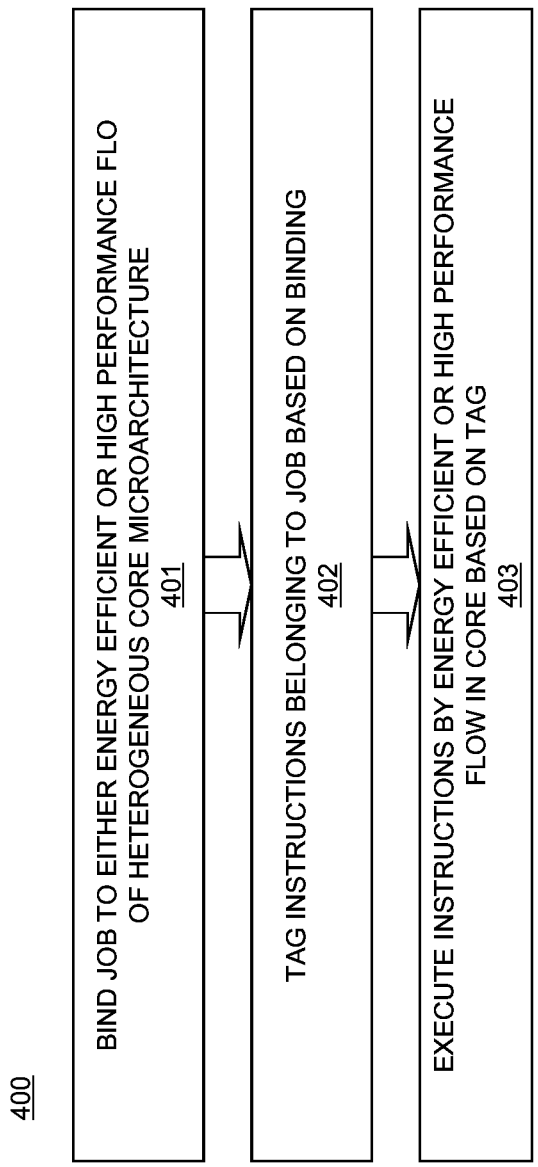
FIG. 4 depicts a process flow for implementing a heterogeneous core microarchitecture in accordance with an embodiment.

FIG. 4 illustrates an embodiment of a method 400 for a heterogeneous core architecture. First, in block 401, a job is bound to a particular flow, e.g., energy efficient or high performance, of the heterogeneous core microarchitecture. The job is being executed by an operating system that is running on a processor comprising a plurality of cores, each core comprising the heterogeneous microarchitecture. Next, in block 402, an instruction corresponding to the job is tagged according to the binding of the job. Then, in block 403, the instruction is executed in a core by the particular flow (e.g., energy efficient or high performance) that is indicated by the tag. The instruction may be executed by any core of a plurality of cores of the processor.

Figure 5:
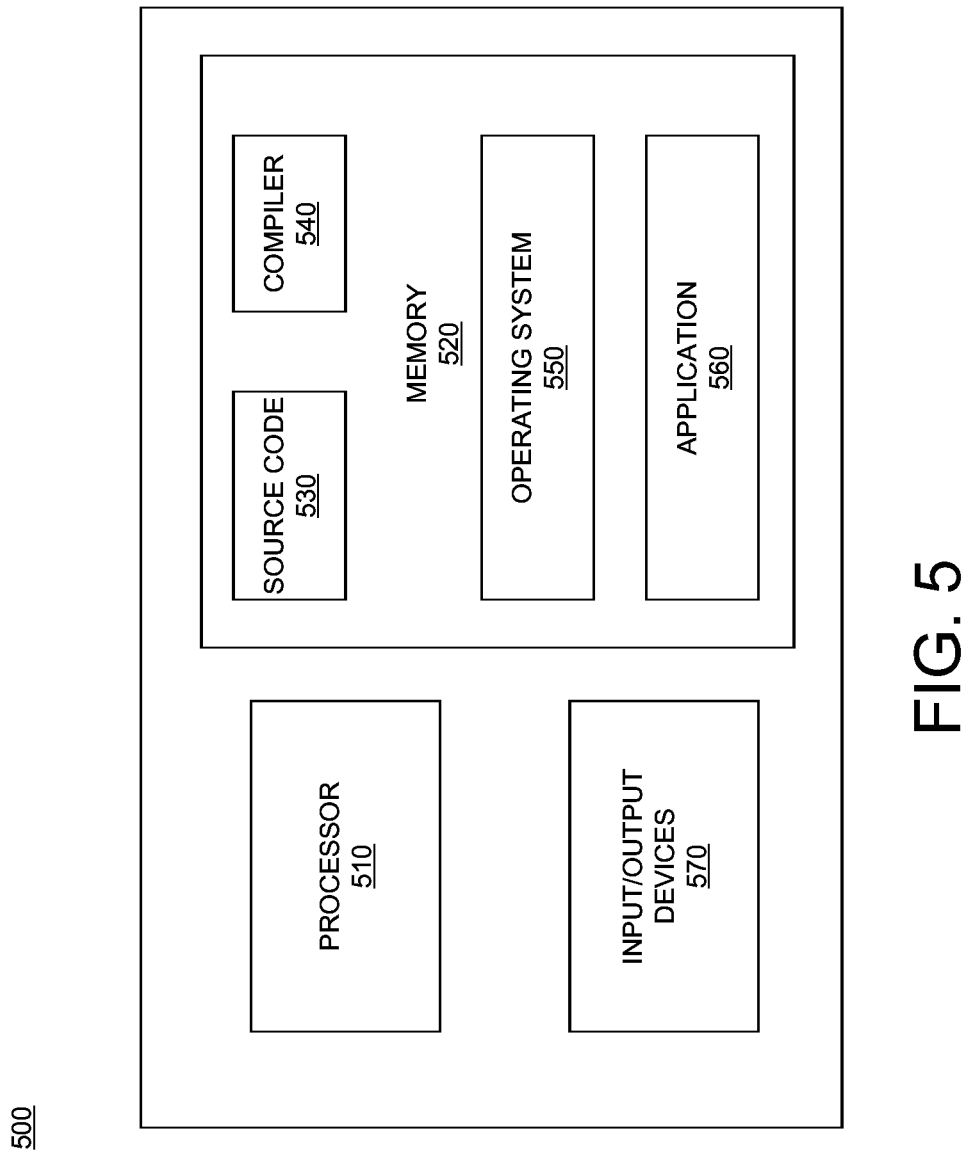
FIG. 5 depicts an embodiment of a computer system for use in conjunction with embodiments of a heterogeneous core microarchitecture.

FIG. 5 illustrates an example of a computer 500 which may be utilized by exemplary embodiments of a heterogeneous core architecture. Various operations discussed above may utilize the capabilities of the computer 500. One or more of the capabilities of the computer 500 may be incorporated in any element, module, application, and/or component discussed herein. For example, embodiments of cores having a heterogeneous core microarchitecture may be incorporated into processor 510.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include reduction of power usage in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing a heterogeneous core microarchitecture, the computer program product comprising:
    a computer readable storage medium having program instructions embodied therewith, the program instructions readable by a processing circuit to cause the processing circuit to perform a method comprising:
    binding, by an operating system running on a virtual machine that is executing on a processor comprising a core comprising a heterogeneous core microarchitecture comprising two or more flows, a job that is being executed by the operating system to a flow of the two or more flows,
    wherein the two or more flows comprise an energy efficient flow and a high performance flow, wherein the energy efficient flow and the high performance flow comprise distinct hardware;

wherein the hardware associated with the energy efficient flow comprises at least one local instruction cache, at least one instruction pipeline, and an L1 data cache, wherein the instruction pipeline is coupled to the at least one instruction cache and the L1 data cache;

wherein the hardware associated with the high performance flow comprises a dedicated L1 instruction cache coupled to two 3-way flow dispatching units, the two 3-way dispatching units being coupled to a plurality of execution units and an L1 data cache;

wherein at least one L2 instruction cache is shared between the high performance flow and the energy efficient flow, wherein the L2 instruction cache is coupled to the dedicated L1 instruction cache of the high performance flow and the L2 instruction cache is coupled to the at least one local instruction cache of the energy efficient flow;

wherein the L1 data cache of the high performance flow is coupled to an L2 data cache and the L1 data cache of the energy efficient flow is coupled to an L2 data cache;

issuing an instruction corresponding to the job with a tag, wherein the tag is set by the operating system, indicating the binding of the job to which the instruction corresponds;

determining, via a tag module, the tag associated with a received instruction;

responsive to the determining, dispatching the instruction to an appropriate hardware according to the tag;

wherein the processor comprises a plurality of cores, and wherein each core in the processor comprises the same microarchitecture;

wherein each flow comprises a respective cache, and wherein coherency is maintained in the caches in the core during operation; and responsive to the determining, executing the instruction by the flow in the core that is indicated by the tag.

* * * * *